Figure 1:
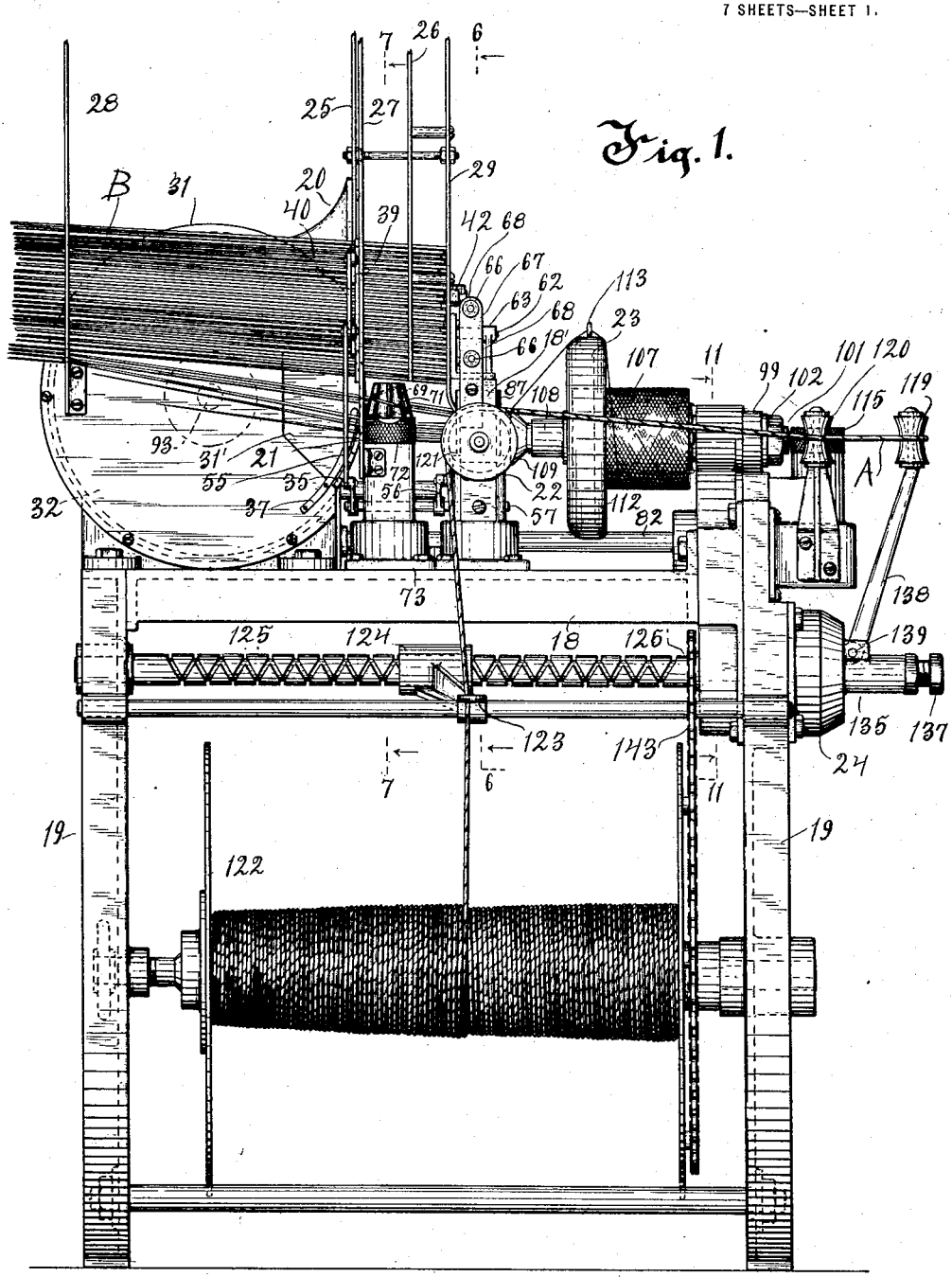

J. A. SCHWANTES.
GRASS TWINE MACHINE.
APPLICATION FILED FEB. 13, 1915.

1,189,877.

Patented July 4, 1916.
7 SHEETS—SHEET 3.

WITNESSES
C. F. Miller.
E. Schowalter.

INVENTOR
Julius A. Schwantes.
By Morsell, Keeney & French,
ATTORNEYS

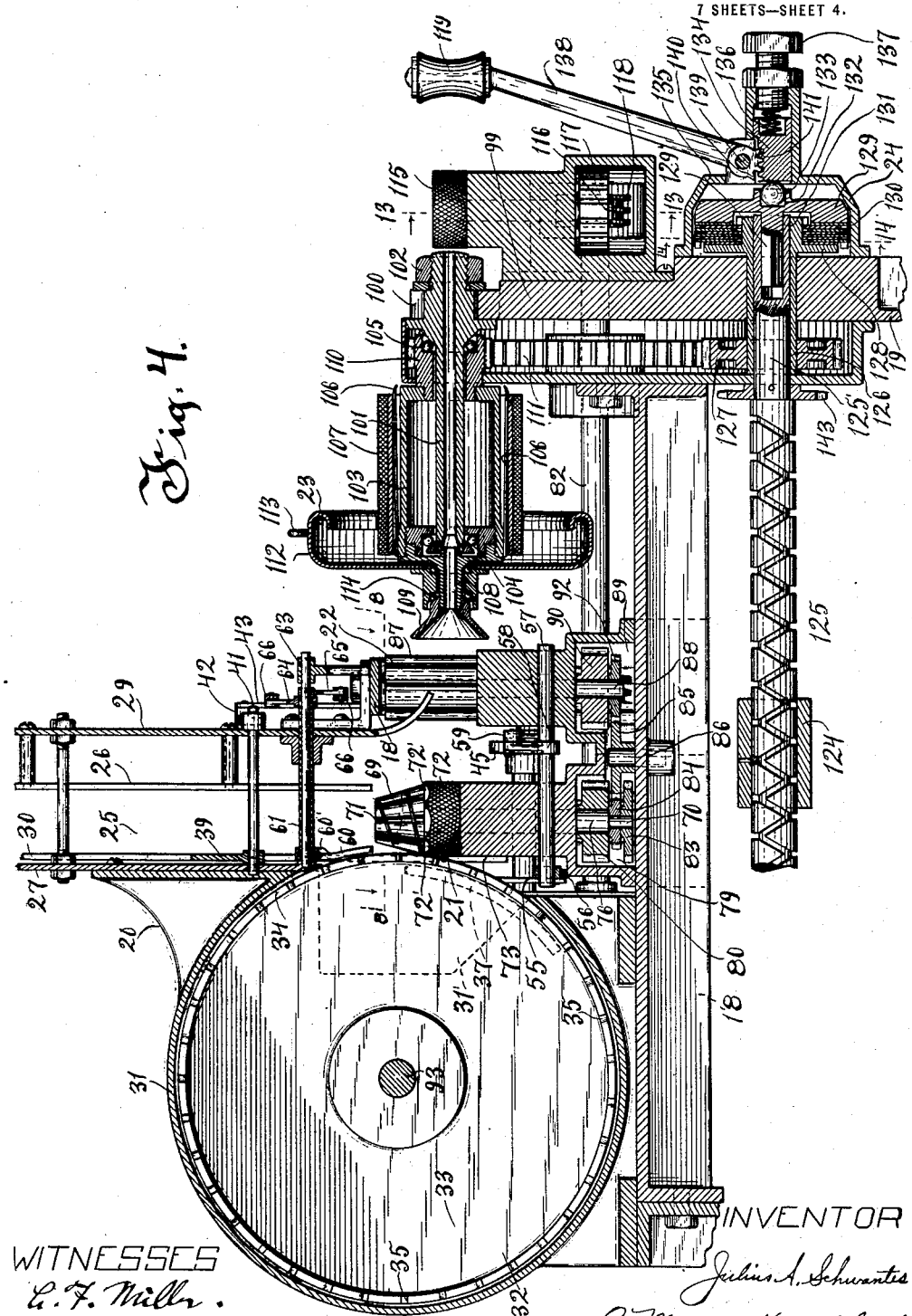

J. A. SCHWANTES.
GRASS TWINE MACHINE.
APPLICATION FILED FEB. 13, 1915.
1,189,877. Patented July 4, 1916.
7 SHEETS—SHEET 5.
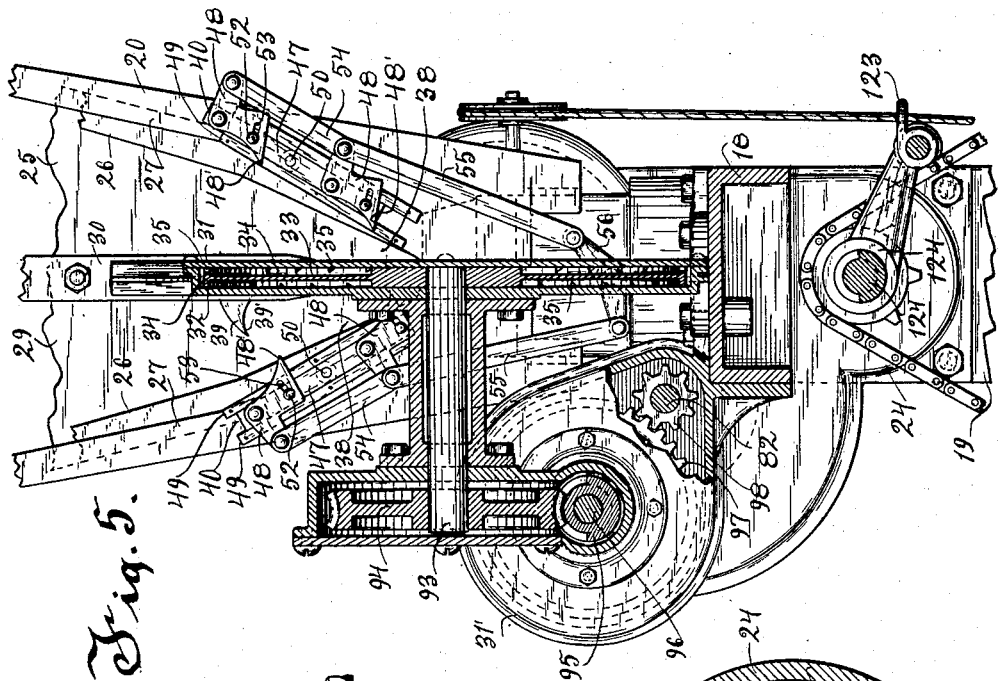
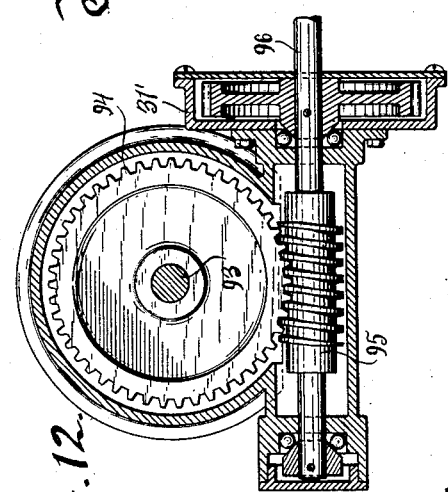
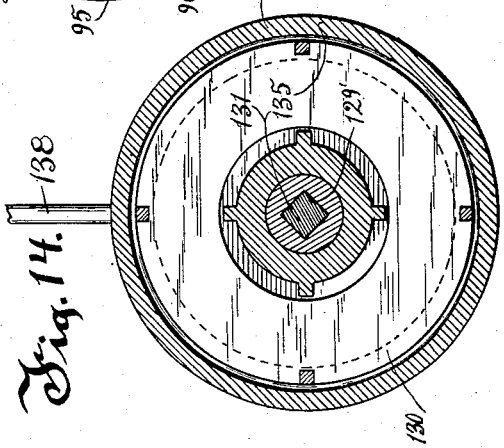
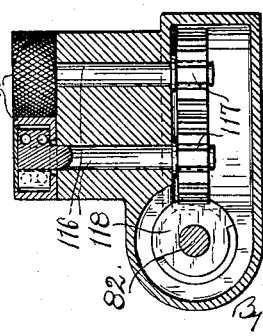
WITNESSES
INVENTOR
ATTORNEYS.

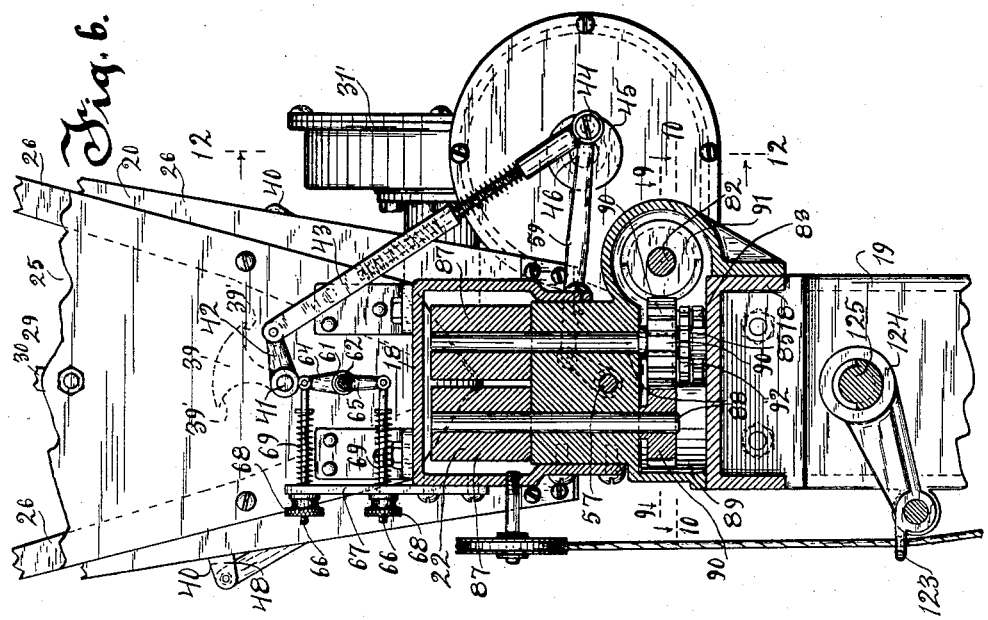
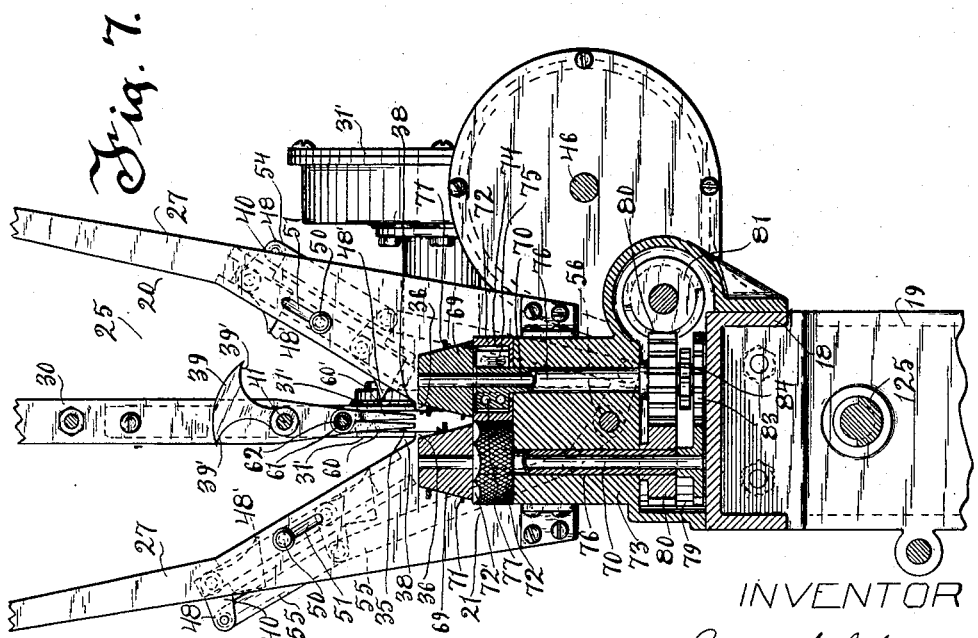

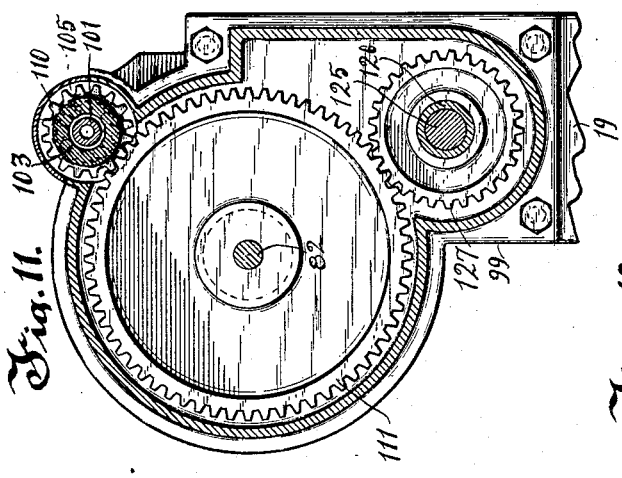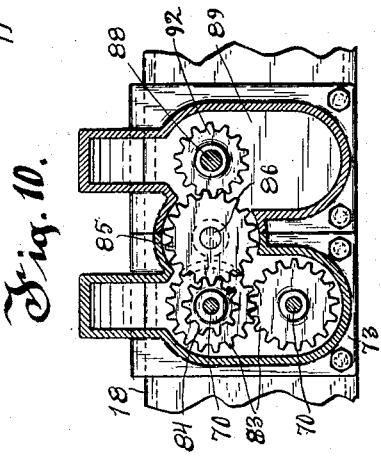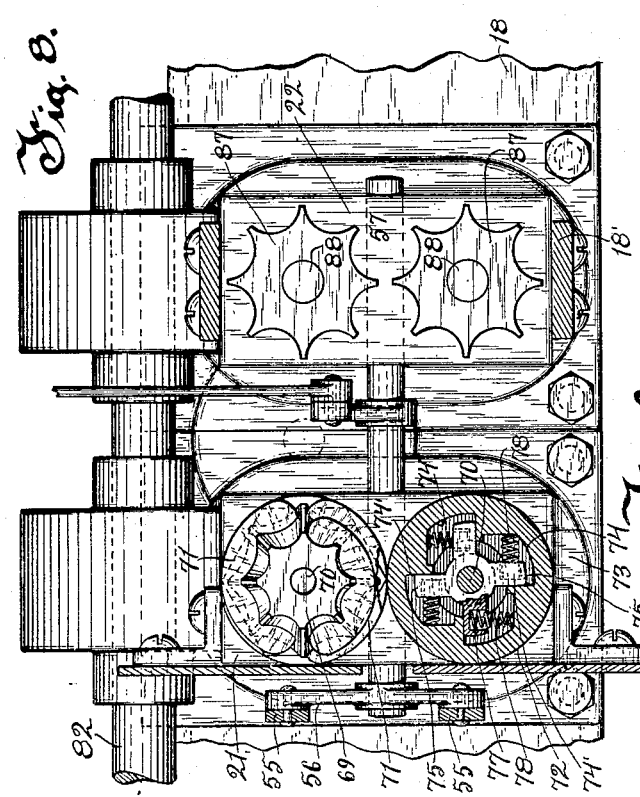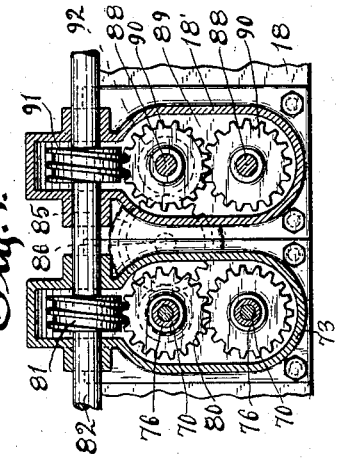

UNITED STATES PATENT OFFICE.

JULIUS A. SCHWANTES, OF GREEN BAY, WISCONSIN, ASSIGNOR TO WILLOW GRASS RUG COMPANY, OF GREEN BAY, WISCONSIN, A CORPORATION OF WISCONSIN.

GRASS-TWINE MACHINE.

1,189,877.   Specification of Letters Patent.   Patented July 4, 1916.

Application filed February 13, 1915. Serial No. 7,922.

*To all whom it may concern:*

Be it known that I, JULIUS A. SCHWANTES, a citizen of the United States, and resident of Green Bay, in the county of Brown and State of Wisconsin, have invented new and useful Improvements in Grass-Twine Machines, of which the following is a description, reference being had to the accompanying drawings, which are a part of this specification.

This invention relates to improvements in grass twine machines more particularly adapted for making twine from sedge grass or what is commonly termed marsh grass, which is used in the manufacture of grass carpet and other articles made of grass.

It is one of the objects of the present invention to provide a grass twine machine having novel means for holding the grass and for selecting grasses from the mass and feeding them in overlapping order to the advancing means which in turn advances the overlapped grasses in a continuous stream to the cord wrapping mechanism.

A further object of the invention is to provide a grass twine machine in which a continuously rotated member is adapted to select and feed the grasses from the mass to the advancing means.

A further object of the invention is to provide a grass twine machine having a novel means for feeding the mass of grasses to the selecting means.

A further object of the invention is to provide a grass twine machine in which the advancing rolls are laterally yieldingly mounted on their driving shafts so that the grasses passing therebetween will be yieldingly engaged thereby.

A further object of the invention is to provide a grass twine machine in which guide rollers rotated at a different rate of speed than the advancing rollers are adapted to direct and feed the advancing rollers.

A further object of the invention is to provide a grass twine machine in which a plurality of grass selecting members are provided which gather bunches of grasses in alternate order and thus form a continuous feed of grass in overlapping order to the cord wrapping mechanism.

A further object of the invention is to provide a grass twine machine having improved means for controlling the feed of the twine wrapping cord.

A further object of the invention is to provide a grass twine machine having improved means for controlling the winding of the finished twine upon a spool so that in the event of any retardation of the finished twine from the wrapping mechanism the speed of rotation of the spool upon which the twine is wound will be reduced or stopped in order to prevent the breaking of the twine.

A further object of the invention is to provide a grass twine machine in which the parts are geared and connected together in a novel manner to form a unitary structure which is of simple construction in its entirety and which is well adapted for the purpose described.

With the above and other objects in view the invention consists of the improved grass twine machine and its parts and combinations as set forth in the claims, and all equivalents thereof.

Figure 2:
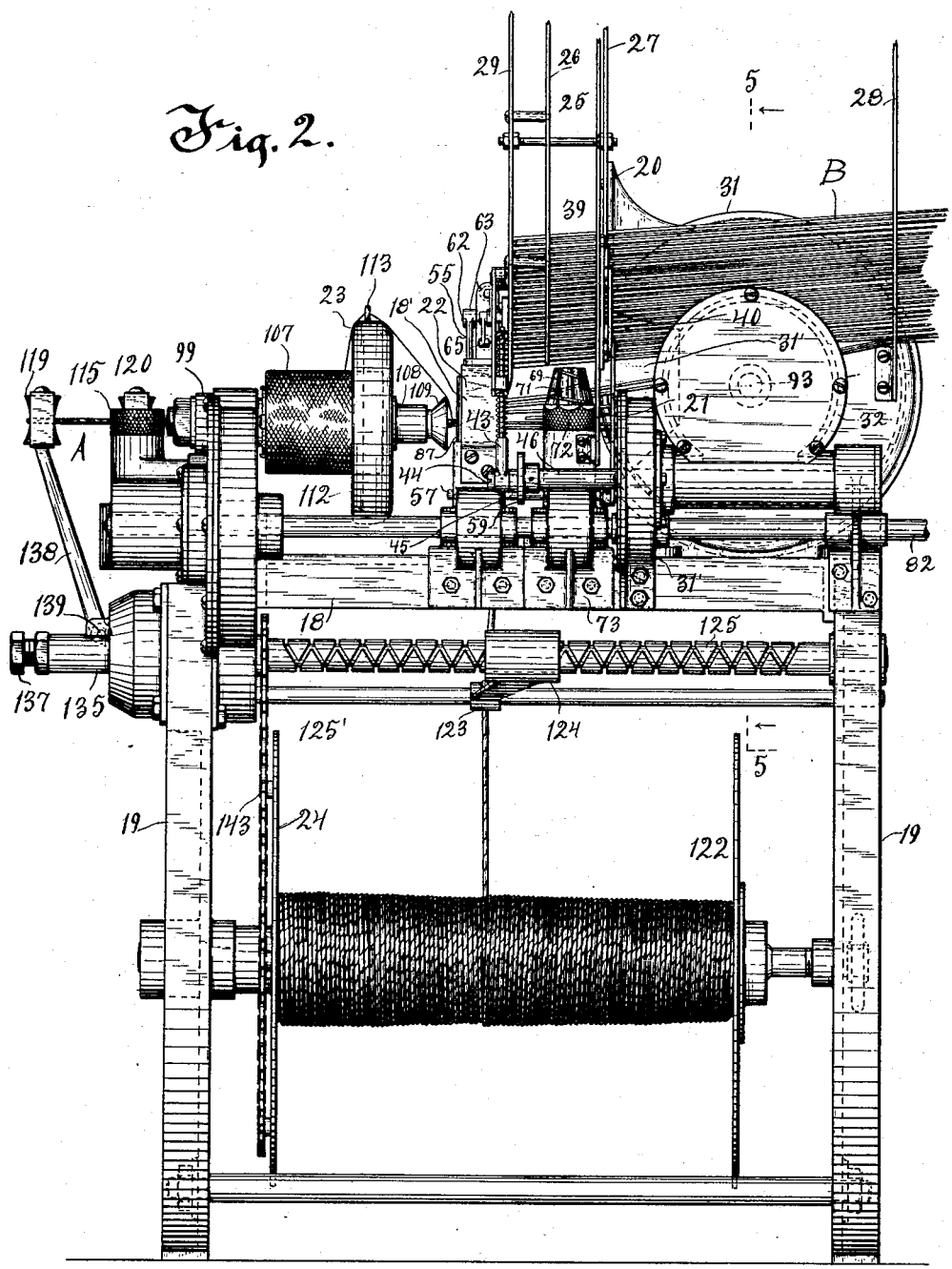
Figure 3:
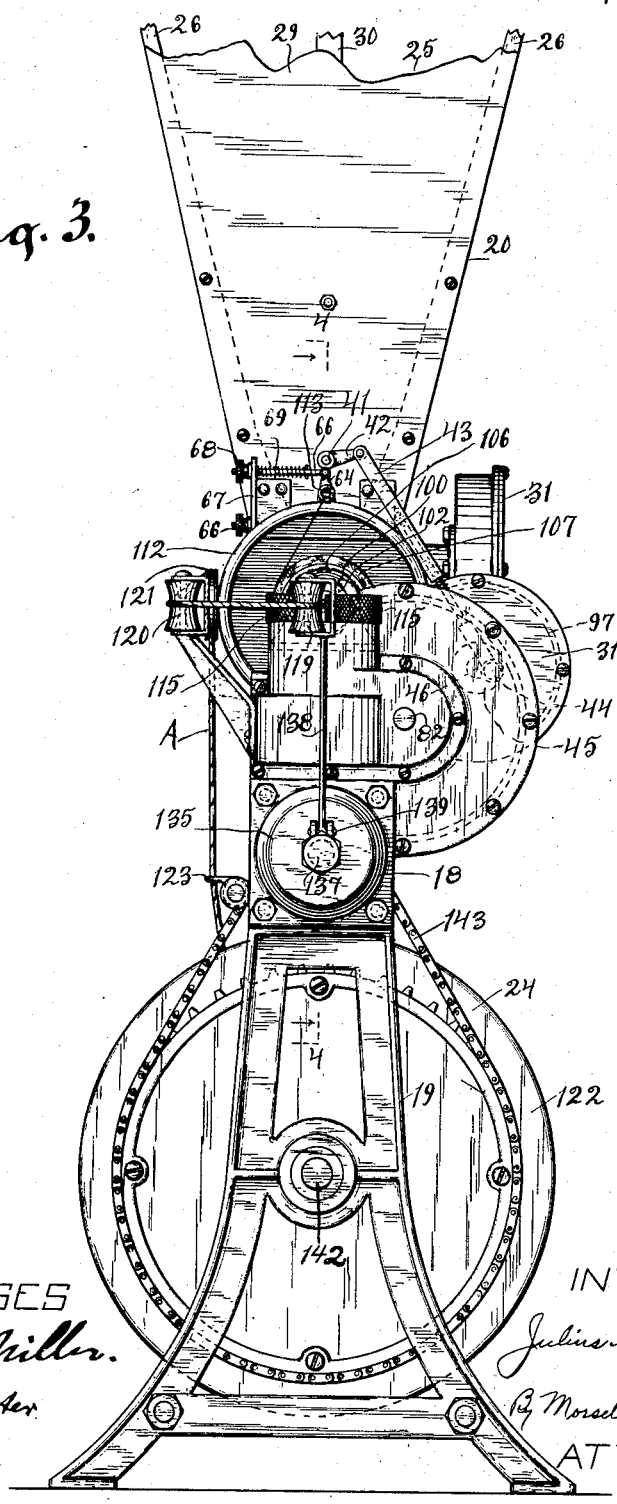

In the accompanying drawings in which the same reference characters indicate the same parts in all of the views: Figure 1 is a front side view of the improved grass twine machine; Fig. 2 is a rear side view thereof; Fig. 3 is an end view of the machine; Fig. 4 is a vertical sectional view, on a larger scale, of the upper portion of the machine taken on line 4—4 of Fig. 3; Fig. 5 is a transverse sectional view of the upper portion of the machine taken on line 5—5 of Fig. 2; Fig. 6 is a similar view thereof taken on line 6—6 of Fig. 1; Fig. 7 is a transverse sectional view of the grass feeding portion of the machine taken on line 7—7 of Fig. 1; Fig. 8 is a horizontal sectional detail view of a portion of the machine taken on line 8—8 of Fig. 4; Fig. 9 is a horizontal sectional detail view thereof taken on line 9—9 of Fig. 6; Fig. 10 is a similar view taken on line 10—10 of Fig. 6; Fig. 11 is a vertical transverse sectional detail view of a portion of the machine taken on line 11—11 of Fig. 1; Fig. 12 is a vertical sectional detail view taken on line 12—12 of Fig. 6; Fig. 13 is a sectional detail view taken on line 13—13 of Fig. 4; and Fig. 14 is a vertical transverse sectional view taken on line 14—14 of Fig. 4.

Referring to the drawings the numeral 18 indicates a horizontally extending table or base plate which is provided at opposite ends with supporting legs or frame members 19 for positioning the said plate a convenient working distance from the floor. Upon the table is mounted the holding and selecting mechanism 20, the guiding and advancing mechanism 21, the guiding and converging means 22, the cord wrapping mechanism 23 and the twine winding mechanism 24. These different mechanisms are adapted to engage the grass in the sequence of order mentioned so that the grass in entering the machine in bunches or masses is continuously acted upon and emerges from the machine as a finished twine which is automatically wound upon a spool for removal and disposition thereof.

Referring to the holding and selecting mechanism the numeral 25 indicates the hopper for holding the grass, and which hopper is formed of upwardly extending diverging holder bars 26, 27 and 28 and a butting or end board 29. The hopper is medially divided into two passageways for the grass by an upstanding central dividing bar 30 and the casing 31 of a selector means 32 mounted on the base in longitudinal alinement with the dividing bar.

The selector means consists of a disk or wheel 33 having a peripheral flange 34 projecting from its opposite sides which is provided with staggered angular recesses 35, and which co-acts with the parallel vertically extending edges 36 of the members 27. The opposite side portions of the selector casing 31 near the holder bars 27 are cut away as indicated by the numeral 31' and the said vertically extending edge portions 36 project into the cut away portion spaces to positions close to the side edge portions of the peripheral flange 34 so that small bunches of grass entering the recesses will be carried downwardly by the selector wheel to positions to be engaged by the guiding and advancing means. The recesses 35 are of angular or V-shaped form with their upper walls, while in grass engaging positions, extending in a horizontal plane to positively move the grass downwardly. When the grasses have been moved downwardly by the selector wheel to proper positions to be engaged by the guiding and advancing means the grasses are deflected out of the recesses 35 by deflecting members in the form of springs 37 which are fastened to opposite sides of the casing 31 and have their upper free ends bearing against the web of the selector wheel inside of the notched flange thereof.

The grasses within the several hopper passageways are forced downwardly into the narrowing outlet openings 38 of the hopper and into the notches or recesses of the selector wheel by means of a rocking segment 39 and reciprocal members 40. The rocking segment 39 is mounted on the inner end of a rock shaft 41 which is journaled in the central dividing bar 30 and in the butting board 29 and projects through the latter. The outer end of the rock shaft is provided with a lever arm 42 which has a yielding linked connection 43 with the wrist pin 44 of a wheel 45 mounted on a worm shaft 46 and is rocked by said parts. The opposite edge portions of the rock segment are curved inwardly toward each other to form pointed ends 39' which easily pass between the grasses and force the grasses therebeneath downwardly into the selector wheel recesses. The yielding link connection 43 serves to prevent the breaking of parts in the event of the segmental member 39 being obstructed or stopped in its movement by an excess amount of feed of grass.

The reciprocal members 40 comprise slidable bars 47 having linked bell-crank levers 48 pivotally mounted thereon which are adapted to have their lower pointed ends 48' enter the passageways of the hopper and also force the grasses downwardly and into the recesses of the selector wheel. The bars 47 are slidably mounted on the holder bars 27 between guides 49 and are held thereon by bolts 50 which extend through elongated slots 51 in the holder bars and thread into the slidable bars. The bell-crank levers are mounted in linked pairs on the slidable bars and the bars are positioned in parallel relation with the lower inner edge portions of the hopper passageways so that as the pairs of bell-crank levers are alternately pushed upwardly the lower pointed ends 48' will be swung outwardly and out of the path of movement of the grass, and when the said pairs of levers are pulled downwardly the lower pointed ends of the levers will be swung into the hopper passageways and engage the grasses and force the same downwardly in connection with the rocking segment. The swing of the bell-crank levers is limited by means of bolts 52 which are threaded in the slidable bars 47 and pass through elongated slots 53 provided in the bell-crank levers. The bell-crank levers are connected together in pairs, as before stated, by the links 54.

The slidable bars are alternately reciprocated and the bell-crank levers oscillated by links 55 which are connected at their upper ends to the lower bell-crank levers and at their lower ends to a two-arm lever 56 mounted on and turning with a rock shaft 57. The rock shaft 57 also has a lever arm 58 mounted fast thereon which is connected to the wrist pin 44 by a connecting rod 59.

In order to adjust or regulate the feed of the grass to the advancing mechanism means are provided for adjusting the depth the grasses can enter the selector wheel recesses and thus limit the amount selected from the mass and moved by the recessed portions of the said wheel. This means comprises a pair of lever feed arms 60 and 60' which are fulcrumed on the dividing bar 30 and depend downwardly therefrom to positions adjacent the periphery of the selector wheel at the points where the grasses enter the recesses of said wheel. The lever feed arms extend transversely with relation to the elongated lengths of the grasses and are adapted to be swung away from or toward each other to limit the number of grasses entering the recesses. The feed arm 60' is mounted on the inner end of a tubular adjusting shaft 61 which is journaled in and extends through the butting board 29, and the feed arm 60 is mounted on the inner end portion of an adjusting shaft 62 which extends through the tubular shaft 61. The inner end of the shaft 61 is journaled in the dividing bar 30 and the outer end is journaled in a bearing 63 projecting upwardly from a casing frame 18' mounted on the base 18. The tubular shaft 61 terminates just beyond the outer side of the butting board and has mounted thereon an upwardly extending arm 64 and the outer end portion of the adjusting shaft 62 adjacent the arm 64 is provided with a downwardly extending similar arm 65. Both of these arms are pivotally connected to the inner ends of threaded adjusting rods 66 which project loosely through an upright bar 67 mounted on the frame 18'. Thumb nuts 68 are threaded on the end portions of the rods projecting through the bar 67 and bear against said bar, and coiled springs 69 surrounding the rods and interposed between the bar and transverse pins extending through the rods serve to yieldingly hold the rods in adjusted positions. This construction provides for very fine and independent adjustments of the feed arms 60 and 60'.

The butt end portions of the grasses of the bunches of grass alternately moved downwardly by the opposite side recesses of the selector wheel pass between conical guide rolls 69 mounted on vertically extending shafts 70. The guide rolls are of corrugated form and are provided with spirally trending flanges or wings 71 which serve to work the grasses downwardly into the bite of milled advancing rolls 72 therebelow which are journaled concentrically with relation to the guide rolls 69 but revolving at a slower rate of speed than said guide rolls. The upper peripheral edge portions of the advancing rolls are slabbed off at an angle as indicated by the numeral 72' to provide an easy entrance for the grasses. The rolls 69 and 72 are positioned above and journaled in a frame casing 73 which is mounted on top of the base 18. The advancing rolls 72 are each formed with a series of internal pockets 74 extending from their bores outwardly to loosely accommodate the radial arms 75 of the upper end of a sleeve 76 which surrounds each shaft 70. The radial arms 75 are each provided with pockets 77 in their side portions to receive the ends of coiled springs 78 which are interposed between the said arms and the walls of the pockets 74 to yieldingly connect the advancing rolls to the sleeves. The coiled springs 78 normally hold the radial arms bearing against the shoulders 74' of the rolls 72 to insure a positive drive of said rolls, and the coiled springs serve to provide an even tension on the grasses passing therebetween and at the same time compensate for the inequalities of the grasses.

The sleeves 76 extend downwardly through the frame casing and into the gear chamber 79 thereof and at their lower end portions are provided with intermeshing gears 80. The gears are rotated by a worm gear connection 81 with one of the gears 80, the said worm gear being mounted on a horizontally extending main drive shaft 82 which extends approximately the full length of the machine and is adapted to drive other parts of the machine later described. The said drive shaft may be connected up to a source of power in any manner desired.

The shafts 70 of the guide conical rolls 89 extend through the sleeves 76 as before stated and at their lower end portions are provided with intermeshing gears 83. One of the shafts 70 is also provided with a pinion 84 which is in mesh with an idle gear 85 journaled on a stud shaft 86.

The guiding and converging means 22 positioned a short distance from the advancing means 21 comprises a pair of corrugated rolls 87 mounted in spaced relation upon the upper ends of two vertically extending parallel shafts 88 which are journaled in the lower portion of the casing frame 18' before mentioned. This casing frame is similar to the frame 73 and is provided with a gear chamber 89 to accommodate intermeshing gears 90 mounted on the lower end portions of the shafts 88 which extend through and are journaled in the said casing frame 18'. One of the gears 90 is in mesh with and is rotated by a worm gear 91 mounted on the main drive shaft 82. One of the shafts 88 is also provided with a gear wheel 92 which is in mesh with and drives the idle gear 85 and the conical guide rolls 69.

The corrugated guiding and converging rolls 87 rotate toward each other in a direction to advance the grasses and the corrugated portions serve to swing the butt ends of the grasses inwardly and between the rollers which might otherwise swing to one side of the rollers. The lower end portion 29' of the butting board 29 is pointed and curved downwardly and outwardly to a position between the rolls 87 to deflect the butt ends of the grasses downwardly between the rolls 87.

The selector wheel 33, before described, is mounted on the inner end of a transverse selector wheel shaft 93 and the outer end of this shaft is provided with a worm wheel 94 which is in mesh with a worm 95 mounted on one end of a horizontal longitudinally extending worm shaft 96. This worm shaft 96 is positioned below the selector shaft 93 and extends in a plane parallel to the longitudinal length of the machine and on its end opposite to the end provided with the worm, is provided with a gear wheel 97 which meshes with and is driven by a pinion 98 mounted on the main drive shaft 82. The gears and worms 94, 95, 97 and 98 are inclosed in casings 31' forming part of the casing 31.

Referring to the twine forming mechanism 23, the numeral 99 indicates a portion of the rear end supporting legs 19 which extends upwardly above the base or plate 18 and at its upper end is provided with an opening or slot 100 in line with the feed of grass from the advancing and guiding rolls. A shouldered twine tube 101 removably resting within the slot 100 and clamped to the upstanding leg portion 99 in fixed position by a nut 102 threaded on the rear end of the tube, extends forwardly from said leg portion. A twine drum 103 surrounding and journaled on the tube by front and rear ball bearings 104 and 105 is provided with spring members 106 which engage the side walls of the bore of the spool of cord 107 mounted on the drum. The end of the drum adjacent the feeding and guiding rolls is provided with a reduced tubular portion 108 having a conical entrance or funnel shaped end 109 into which the grasses are fed forwardly by the advancing rolls 72. The bore of the reduced tubular portion of the twine drum is approximately of the same diameter as the bore of the shouldered tube 101 and is in axial alinement therewith so that the stream of grass can pass freely through the bores of the drum tubular portion and twine tube. The rear end portion of the twine drum is in the form of a pinion 110 which is in mesh and is rotated by a gear wheel 111 mounted on the main drive shaft 82. This construction provides for rotating the drum and the tubular end portion thereof and the ball of twine mounted on the drum, at a rapid rate of speed while the twine is in a fixed position.

The tubular end portion of the drum has journaled thereon a cup shaped twine tension device 112 provided with a projecting peripheral eye 113 through which the twine or cord from the ball 107 passes in being wrapped spirally around the stream of grass passing into the funnel shaped end of the wrapping mechanism. As the twine is wrapped around the overlapping lengths of grass the tension device rotates with the drum at a less and also varying rate of speed in order to unwind the twine from the ball and also to compensate for the constantly changing diameter of the unwinding ball of twine. The tension device 112 has a ball bearing connection 114 with the drum end to eliminate friction and the device is of cup shape to eliminate projections upon which the twine might catch and to also balance the device and prevent undue vibration.

The spirally wound overlapped lengths of grass in the form of grass twine A passes through the drum tube 101 and between milled feed rolls 115 which are yieldingly mounted on vertical shafts 116. The feed rolls 115 are yieldingly mounted on the shafts 116 in the same manner as the advancing rolls 72 are mounted on their respective shafts, and yieldingly engage the material in the same way and it is therefore thought that a repetition of the specific description is unnecessary.

The lower ends of the shafts 116 are provided with intermeshing pinions 117 and one of these pinions is in mesh with a worm 118 mounted on the main drive shaft 82.

The grass twine A in leaving the feed rolls 115 passes around a clutch lever pulley 119 and from thence around idle pulleys 120 and 121 to the winding spool 122 for removal from the machine. The grass twine A in passing from the idle pulley 121 to the winding spool 122 extends through the eye 123 of the twine guide member 124 to properly wind the grass twine in layers upon the spool. The guide member 124 is mounted on a reversely threaded rod 125 and is caused to travel back and forth on said rod in the ordinary manner common to grass twine machines.

In winding the grass twine upon the spool it is desirable to stop the winding operation if for any reason the twine should be checked or unduly retarded in order to prevent the breaking of the twine. In order to accomplish this result the shaft 125 is loosely journaled in the frame or supporting portion 19 and its driven end 125' extends loosely through a gear and clutch sleeve 126 which is also journaled in the frame. This sleeve on one end carries a pinion 127 which meshes with the gear wheel 111 and is driven thereby. The opposite end of the sleeve is provided with a friction clutch member 128 which is engaged by a complementary clutch member 129. The engagement between the two clutch members comprises a series of interposed plates 130 alternate ones of which are connected to the opposite clutch members so that when the clutch members are pressed together the frictional contact between the plates will bind the two parts rotatively together, and when the pressure is removed the reversely threaded shaft 125 will be rotatively disconnected from the sleeve 126. The end 125' of the threaded shaft 125 is provided with a square bore 131 into which slidably extends the squared projection 129' of the clutch member 129. The outer side of the clutch member 129 is provided with a pocket 132 in which a bearing ball 133 is positioned. A plunger rack 134 slidably mounted in the clutch casing 135 and bearing against the ball 133 at its inner end, is engaged at its outer end by a coiled spring 136 which is interposed between the said outer end of the plunger and an adjusting bolt or screw 137 threaded in said clutch casing.

The clutch lever 138 upon the upper end of which the clutch pulley 119 is mounted is pivoted at its lower end portion to the clutch casing 135 by a pin 139 and the lower end portion of the said lever is provided with segmental teeth 140 which mesh with the teeth 141 of the plunger 134. This construction provides for the clutch members being normally in clutching engagement with each other and with the clutching lever being in the position shown in the drawings. Now if the grass twine passing around the clutch pulley 119 is retarded or checked in any manner the clutch lever will be drawn inwardly toward the cord wrapping mechanism and the plunger 134 will be moved outwardly and the clutch members will be rotatively disengaged and the rotation of the reversely threaded shaft 125 will be stopped until the tension of the twine is again normal.

The twine spool 122 is removably mounted on a shaft 142 journaled in the frame and is driven by a chain and sprocket wheel connection 143 with the reversely threaded shaft 125 so that when the threaded shaft is disengaged by the clutch and stopped the spool shaft will also be stopped.

The grass is indicated by the letter B.

From the foregoing description it will be seen that the grass twine machine is of very simple construction and is well adapted for the purpose described.

What I claim as my invention is:

1. A grass twine machine, comprising a grass holder, a rotary selector means having side notches for removing grasses downwardly from the bottom portions of the holder, means for advancing the removed grasses in overlapping order, and means for wrapping cord spirally around the overlapped grasses.

2. A grass twine machine, comprising a grass holder, a rotary selector means having side notches for removing grasses downwardly from the bottom portions of the holder, means for advancing the removed grasses in overlapping order, and means including in part a non-rotatable tubular member and a rotatable member for wrapping the cord spirally around the overlapped grasses.

3. A grass twine machine, comprising a grass holder having a plurality of discharge openings, a rotary selector means having side notches on its opposite side peripheral edge portions for moving grasses laterally through the discharge openings of the holder, means for advancing the removed grasses in overlapping order, and means for wrapping cord spirally around the overlapped grasses.

4. A grass twine machine, comprising a grass holder having a plurality of discharge openings, a rotary selector means having side notches on its opposite side peripheral edge portions for moving grasses laterally through the discharge openings of the holder, means for advancing the removed grasses in overlapping order, and means including in part a non-rotatable tubular member and a rotatable member for wrapping cord spirally around the overlapped grasses.

5. A grass twine machine, comprising a grass holder having a plurality of discharge openings, a rotary selector wheel having a peripheral flange provided with notches in its opposite side portions for removing grasses from the holder and through the discharge openings thereof, revoluble means for advancing the removed grasses in overlapping order, and means for wrapping a cord spirally around the overlapped grasses.

6. A grass twine machine, comprising a grass holder having a plurality of discharge openings, a rotary selector wheel having a peripheral flange provided with notches in its opposite side portions for removing grasses from the holder and through the discharge openings thereof, revoluble means for advancing the removed grasses in overlapping order, and means including in part a non-rotatable tubular member and a rotatable member through which the grasses pass for wrapping a cord spirally around the overlapped grasses.

7. A grass twine machine, comprising a grass holder having a plurality of contracted discharge openings, a casing partly extending into the holder and forming a partition therefor between the discharge openings, said casing having openings on its opposite sides adjacent the discharge openings, a rotary selector wheel positioned within the casing and having a peripheral flange provided with notches in its opposite side portions for removing grasses from the holder and through the discharge openings, said selector wheel engaging the grasses while passing the casing openings, revoluble means for advancing the removed grasses in overlapping order, and means for wrapping a cord spirally around the overlapped grasses.

8. A grass twine machine, comprising a holder formed in part of upwardly extending and diverging arms having lower parallel edge portions, a rotary selector wheel having a peripheral flange which passes and approximately fills the space between the parallel edge portions of the arms, said flange having notches in its opposite sides which co-act with the parallel edge portions in removing grasses from the holder, a casing partly covering the selector wheel and dividing the hopper into two compartments, revoluble means for advancing in overlapping order the grasses moved by the selector wheel, and means for wrapping a cord spirally around the overlapped grasses.

9. A grass twine machine, comprising a holder formed in part of upwardly extending and diverging arms having lower parallel edge portions, a rotary selector wheel having a peripheral flange which passes and approximately fills the space between the parallel edge portions of the arms, said flange having notches in its opposite sides which co-act with the parallel edge portions in removing grasses from the holder, a casing partly covering the selector wheel and dividing the hopper into two compartments, a revoluble means for advancing in overlapping order the grasses moved by the selector wheel, and means including in part a non-rotatable tubular member and a rotatable member through which the grasses pass for wrapping a cord spirally around the overlapped grasses.

10. A grass twine machine, comprising a grass holder, oscillating means for working the grasses downwardly in the holder, a rotary selector means having side notches for removing grasses downwardly from the bottom portions of the holder, means for advancing the removed grasses in overlapping order, and means for wrapping cord spirally around the overlapped grasses.

11. A grass twine machine, comprising a grass holder, an oscillating means for working the grasses downwardly in the holder, reciprocating means for working the grasses downwardly, a rotary selector means having side notches for removing grasses downwardly from the bottom portion of the holder, means for advancing the moved grasses in overlapping order, and means for wrapping cord spirally around the overlapped grasses.

12. A grass twine machine, comprising a grass holder formed in part of upwardly extending and diverging arms having lower parallel portions, a rotary selector wheel having a side notched peripheral flange which passes between the parallel edge portions and co-acts therewith in removing grasses from the holder, oscillating means for working the grasses into the notches, reciprocating means having oscillating grass engaging portions for working the grasses into the notches, means for advancing the grasses in overlapping order, and means for wrapping a cord spirally around the overlapped grasses.

13. A grass twine machine, comprising a grass holder formed in part of upwardly extending and diverging arms having lower parallel portions, a rotary selector wheel having a side notched peripheral flange which passes between the parallel edge portions and co-acts therewith in removing grasses from the holder, oscillating means for working the grasses into the notches, reciprocating means having oscillating grass engaging portions for working the grasses into the notches, means for advancing the grasses in overlapping order, and means including in part a non-rotatable tubular member and a rotatable member through which the grasses pass for wrapping a cord spirally around the overlapped grasses.

14. A grass twine machine, comprising a grass holder formed in part of upwardly extending and diverging arms having lower parallel portions which extend toward each other, a rotary selector wheel having a side notched peripheral flange which passes between and close to the parallel edge portions and co-acts therewith in removing grasses from the holder, said notches being of angular form and staggered with relation to the notches of the opposite sides of the peripheral flange, a casing covering said selector wheel and having openings registering with the parallel edge portions of the arms, means for regulating the amount of grass entering the notches, oscillating means for working the grasses downwardly in the hopper, reciprocating means having oscillating grass engaging portions for working the grass downwardly in the hopper, revoluble means for advancing the grasses in overlapping order, means revolving at a different rate of speed than the advancing means for guiding the grasses into engagement with the advancing means, means for converging the advancing grasses to a central position, and means for wrapping a cord spirally around the overlapped grasses.

15. A grass twine machine, comprising a grass holder formed in part of upwardly extending and diverging arms having lower parallel portions which extend toward each other, a rotary selector wheel having a side notched peripheral flange which passes between and close to the parallel edge portions and co-acts therewith in removing grasses from the holder, said notches being of angular form and staggered with relation to the notches of the opposite sides of the peripheral flange, a casing covering said selector wheel and having openings registering with the parallel edge portions of the arms, means for regulating the amount of grass entering the notches, means extending into the openings of the casing for removing the grasses from the notches, oscillating means for working the grasses downwardly in the hopper, reciprocating means having oscillating grass engaging portions for working the grass downwardly in the hopper, revoluble means for advancing the grasses in overlapping order, means revolving at a different rate of speed than the advancing means for guiding the grasses into engagement with the advancing means, means for converging the advancing grasses to a central position, and means for wrapping a cord spirally around the overlapped grasses.

16. In a feed mechanism for a machine of the character described, a grass holder having a lower vertically extending edge portion, a selector wheel positioned to have its side portion near its periphery revolve closely to the vertically extending edge and having side notches which co-act with said edge in holding grasses within the notches while the grasses are being moved by the wheel, and means for deflecting grasses out of the notches when the filled notches have passed the vertically extending edge.

17. In a feed mechanism for a machine of the character described, a grass holder having parallel edge portions, a selector wheel positioned to have its opposite side portions near its periphery revolve between the parallel edges and adjacent thereto and having side notches which co-act with the parallel edges in holding grasses within the notches while the grasses are being moved by the wheel, and means extending inwardly toward the wheel from opposite sides thereof for deflecting grasses out of the notches when the filled notches have passed the parallel edges.

18. In a feed mechanism for a machine of the character described, a grass holder having parallel edge portions, a selector wheel positioned to extend into the holder and having a peripheral flange projecting laterally from opposite sides of the wheel which revolves between the parallel edge portions and close thereto and having opposite staggered notches which co-act with the parallel edges in holding grasses within the notches while the grasses are being moved by the wheel, and yielding members positioned on opposite sides of the wheel and extending inwardly toward the wheel with their free ends extending to positions within the circumference of the flange and beyond the bottom portions of the recesses to deflect the grasses out of the notches when the filled notches have passed the parallel edge portions.

19. In a feed mechanism for a machine of the character described, a grass holder having parallel edge portions, a selector wheel positioned to extend into the holder and having a peripheral flange projecting laterally from opposite sides of the wheel which revolves between the parallel edge portions and close thereto and having opposite staggered notches which co-act with the parallel edges in holding grasses within the notches while the grasses are being moved by the wheel, lever arms for adjusting the depth the grasses can enter the notches, and yielding members positioned on opposite sides of the wheel and extending inwardly toward the wheel with their free ends extending to positions within the circumference of the flange and beyond the bottom portions of the recesses to deflect the grasses out of the notches when the filled notches have passed the parallel edge portions.

20. In a feed mechanism for a machine of the character described, a grass holder having parallel edge portions, a selector wheel positioned to extend into the holder and having a peripheral flange projecting laterally from opposite sides of the wheel which revolves between the parallel edge portions and close thereto and having opposite staggered notches which co-act with the parallel edges in holding grasses within the notches while the grasses are being moved by the wheel, lever arms for adjusting the depth the grasses can enter the notches, oscillating means for working the grasses in the holder toward the selector wheel and the parallel edge portions of the holder, and yielding members positioned on opposite sides of the wheel and extending inwardly toward the wheel with their free ends extending to positions within the circumference of the flange and beyond the bottom portions of the recesses to deflect the grasses out of the notches when the filled notches have passed the parallel edge portions.

21. In a feed mechanism for a machine of the character described, a grass holder having parallel edge portions, a selector wheel positioned to extend into the holder and having a peripheral flange projecting laterally from opposite sides of the wheel which revolves between the parallel edge portions and close thereto and having opposite staggered notches which co-act with the parallel edges in holding grasses within the notches while the grasses are being moved by the wheel, lever arms for adjusting the depth the grasses can enter the notches, oscillating means for working the grasses in the holder toward the selector wheel and the parallel edge portions of the holder, reciprocating means having grass engaging oscillating members for working the grasses in the holder toward the selector wheel and the parallel edge portions of the holder, and yielding members positioned on opposite sides of the wheel and extending inwardly toward the wheel with their free ends extending to positions within the circumference of the flange and beyond the bottom portions of the recesses to deflect the grasses out of the notches when the filled notches have passed the parallel edge portions.

22. In an advancing mechanism for a machine of the character described, a pair of oppositely rotated shafts, rollers laterally yieldingly mounted thereon for advancing grasses entering therebetween, and guide rollers mounted concentrically with relation to the advancing rollers, said guide rollers rotating in opposite directions and at a different rate of speed than the advancing rollers.

23. In an advancing mechanism for a machine of the character described, a pair of oppositely rotated shafts, rollers laterally yieldingly mounted thereon for advancing grasses entering therebetween, and guide rollers mounted concentrically with relation to the advancing rollers, said guide rollers being of conical form and having angular flanges projecting therefrom rotating in opposite directions and at a different rate of speed than the advancing rollers.

24. In an advancing mechanism for a machine of the character described, a pair of oppositely rotated tubular shafts, rollers laterally yieldingly mounted thereon for advancing grasses, guide shafts extending through the tubular shafts and rotated at a different rate of speed than the tubular shafts, and conical rollers mounted on the guide shafts and provided with angular flanges projecting radially therefrom.

25. In an advancing mechanism for a machine of the character described, a pair of oppositely rotated tubular shafts provided with laterally projecting arms, advancing rollers laterally loosely mounted on the tubular shafts and having pockets into which the shaft arms extend, yielding means interposed between some of the walls of the pockets and the arms, oppositely rotated guide shafts extending through the tubular shafts, and flanged conical rollers mounted on the guide shafts adjacent the advancing rollers.

26. In a cord wrapping mechanism for a machine of the character described, a support having a non-rotatable tube removably mounted thereon through which grasses in overlapping order pass, a drum journaled on the tube and having a reduced end portion extending in front of the entrance end of the non-rotatable tube, said reduced end portion having a flaring entrance end, and a cup shaped member journaled on the reduced end portion and provided with an eye through which the cord passes in traveling from the ball to the grasses.

In testimony whereof, I affix my signature, in presence of two witnesses.

JULIUS A. SCHWANTES.

Witnesses:
F. S. GRISWOLD,
H. J. JACQUMIN.

Copies of this patent may be obtained for five cents each, by addressing the "Commissioner of Patents Washington, D. C."